United States Patent [19]

Freedman

[11] 3,899,512

[45] Aug. 12, 1975

[54] BENZOXEPIN DERIVATIVES

[75] Inventor: Jules Freedman, Thiensville, Wis.

[73] Assignee: Colgate-Palmolive Company, New York, N.Y.

[22] Filed: Apr. 22, 1974

[21] Appl. No.: 462,604

Related U.S. Application Data

[63] Continuation-in-part of Ser. No. 339,057, March 8, 1973, abandoned.

[52] U.S. Cl. .................. 260/343.2 R; 260/295.5 B; 260/332.2 H; 424/279
[51] Int. Cl.² ...................................... C07D 313/10
[58] Field of Search 260/343.2 R, 295.5 B, 332.2 H

[56] References Cited

UNITED STATES PATENTS 3,624,083   11/1971   Dobson et al.................... 260/343.2

*Primary Examiner*—John M. Ford
*Attorney, Agent, or Firm*—T. F. Kryshak; M. L. Youngs

[57] ABSTRACT

The compounds are benzoxepinones which are central nervous system depressants. A compound disclosed is 8,9,10,11-tetrahydro-3-hydroxydibenz[b,d]oxepin-6(7H)one.

10 Claims, No Drawings

BENZOXEPIN DERIVATIVES

RELATED CASE

This application is a continuation-in-part of my earlier application, Ser. No. 339,057, filed Mar. 8, 1973 now abandoned.

BACKGROUND OF THE INVENTION

The compound 2,3-dihydro-7,9-dimethyl-1-benzoxepin-2-one-5-carboxylic acid was disclosed by R. V. Smith and M. D. Bealor in J. Org. Chem., 27, 3,092 (1962).

DETAILED DESCRIPTION

The compounds of the present invention have the following formula:

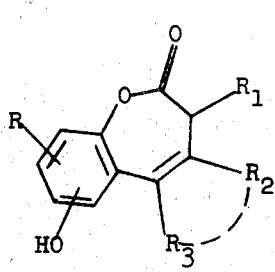

in which R is hydrogen or a straight chain or branched alkyl of 1 to 9 carbon atoms such as methyl, ethyl, isopropyl or butyl, $R_1$ is hydrogen, a lower alkyl of 1 to 4 carbon atoms or phenyl, and $R_2$ and $R_3$ are the same or different and may be hydrogen, a lower alkyl of 1 to 4 carbon atoms, an aryl such as phenyl or a nuclear substituted phenyl such as dimethyl, a halophenyl such as dichlorophenyl or trifluoromethylphenyl, a heterocyclic such as nicitinoyl or thenoyl, or $R_2$ and $R_3$ may be joined together by a straight or branched alkylidene chain to form a cycloalkyl such as cyclohexyl or methylcyclohexyl.

The compounds of the present invention may be conveniently prepared by the reaction of a phenol such as resorcinol with a γ-keto acid or ester such as 4-methyl-2-oxocyclohexaneacetic acid in the presence of a condensing agent such as polyphosphoric acid, boron trifluoride or phosphorous oxychloride. The process may be illustrated as follows:

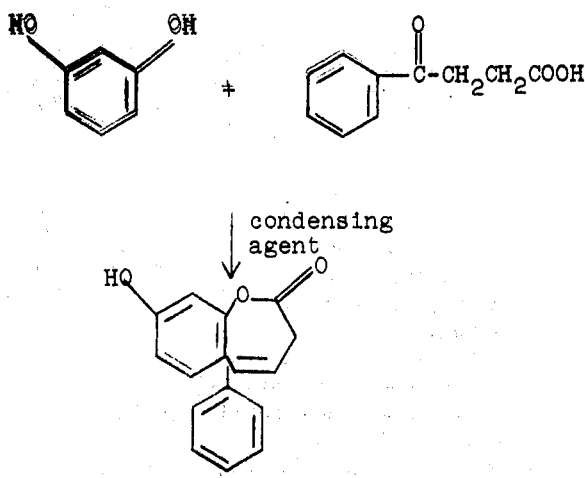

The above-illustrated reaction is a modification of the well-known Pechmann reaction which is described in the literature (*Organic Reactions*, Vol. 7, page 1, 1953).

Representative of the phenols which may be employed in the reactions are the following:

resorcinol,
orcinol,
5-n-hexylresorcinol,
olivetol, and
5-(1,2-dimethylheptylresorcinol).

Representative of the γ-keto acids and esters which may be employed are the following:

4-methyl-2-oxocylcohexaneacetic acid,
3-benzoylpropionic acid,
3-(3,4-dichlorobenzoyl)-propionic acid,
2-oxocyclohexaneacetic acid,
3-(3-nicitinoyl)propionic acid,
3-(2-thenoyl)propionic acid,
3-(4-fluorobenzoyl)propionic acid,
3-(4-methoxybenzoyl)propionic acid,
3-benzoylbutyric acid,
2-methyl-3-benzoylbutyric acid,
2-phenyl-3-benzoylbutyric acid,
ethyl-2-oxocyclohexaneacetate, and
ethyl-2-oxo-4-methylcyclohexaneacetate.

Representative of the benzoxepinones which may be prepared by the described process are the following:

8,9,10,11-tetrahydro-3-hydroxydibenz[b,d]oxepin-6(7H)one,
8,9,10,11-tetrahydro-3-hydroxy-10-methyldibenz[b,d]oxepin-6(7H)one,
8,9,10,11-tetrahydro-3,10-dimethyl-1-hydroxydibenz[b,d]oxepin-6(7H)one,
8,9,10,11-tetrahydro-1-hydroxy-10-methyl-3-n-pentyldibenz[b,d]oxepin-6(7H) one,
3-(1,2-dimethylheptyl)-8,9,10,11-tetrahydro-1-hydroxy-10-methyldibenz[b,d]oxepin-6(7H)one,
3-n-hexyl-8,9,10,11-tetrahydro-1-hydroxy-10-methyldibenz[b,d]oxepin-6(7H)one,
3-n-pentyl-8,9,10,11-tetrahydro-1-hydroxy-10-methyldibenz[b,d]oxepin-6(7H)one,
5-phenyl-2,3-dihydro-8-hydroxy-1-benzoxepin-2-one,
5-(3,4-dichlorophenyl)-2,3-dihydro-8-hydroxy-1-benzoxepin-2-one,
5-(3-nicitinoyl)-2,3-dihydro-8-hydroxy-1-benzoxepin-2-one,
5-(3-thenoyl)-2,3-dihydro-8-hydroxy-1-benzoxepin-2-one,
5-(4-fluorophenyl)-2,3-dihydro-8-hydroxy-1-benzoxepin-2-one,
5-(4-methoxyphenyl)-2,3-dihydro-8-hydroxy-1-benzoxepin-2-one,
5-phenyl-2,3-dihydro-8-hydroxy-6-methyl-1-benzoxepin-2-one,
5-phenyl-8-methyl-6-hydroxy-2,3-dihydro-1-benzoxepin-2-one,
5-(3-nicitinoyl)-8-n-hexyl-6-hydroxy-2,3-dihydro-1-benzoxepin-2-one,
5-(3-thenoyl)-8-n-hexyl-6-hydroxy-2,3-dihydro-1-benzoxepin-2-one, 5-(4-fluorophenyl)-8-n-hexyl-6-hydroxy-2,3-dihydro-1-benzoxepin-2-one,
5-(4-methoxyphenyl)-8-n-hexyl-6-hydroxy-2,3-dihydro-1-benzoxepin-2-one,
5-(phenyl-3-methyl)-8-n-hexyl-6-hydroxy-2,3-dihydro-1-benzoxepin-2-one, and
3,5-diphenyl-8-n-hexyl-6-hydroxy-2,3-dihydro-1-benzoxepin-2-one.

The benzoxepinones thus obtained are useful as intermediates in the preparation of the corresponding benzoxepines which are central nervous system depressants.

The novel compounds of the invention also have been found to elicit a central nervous system depressant effect in animals. For example, the compound 9,9-,10,11-tetrahydro-3-hydroxydibenz[b,d]oxepin-6(7H)one has produced in mice in behavioral screening tests a behavioral profile typical of that produced by mild central nervous system depressants of the tranquilizer type. In mice receiving 100 mg/kg of the compound intraperitoneally as a 5 percent aqueous suspension, a central nervous system depressant effect was demonstrated. As an added result of the behavioral testing, the compound was found to have an $LD_{50}$ of more than 1,000 mg/kg. The behavioral studies were conducted in accordance with the procedures set forth by Irwin in "Animal and Clinical Pharmacologic Techniques in Drug Evaluation," J. H. Nodine and P. E. Siegler, Ed., Year Book Publishers, Inc. (1964), pp. 36–54.

When used as pharmaceutical agents it is preferred to combine the compounds with conventional pharmaceutical additives, such as diluents, flavoring agents, disintegrating agents, and to form them into conventional unit dosage forms, such as tablets or capsules for oral use, or sterile liquids for parenteral administration.

The unit dosage forms such as tablets or capsules will generally contain a concentration of 0.1 to 10 percent by weight of one or more of the active ingredients. While the exact daily dose of the active ingredient will depend upon many factors, including the severity of the patient's condition and the other medication being administered, it will generally range from 10 to 250 mg. per day.

The following examples are presented to illustrate the practice of this invention:

EXAMPLE 1

8,9,10,11-Tetrahydro-3-hydroxydibenz[b,d]oxepin-6(7H)one

A mixture of 26.7 g. (0.145 mole) of ethyl 2-oxocyclohexaneacetate, 16.5 g. (0.15 mole) of resorcinol, and 75 g. of polyphosphoric acid is stirred for 2 hours. When the exothermic reaction ceases, the mixture is poured into 150 ml. of water and stirred until the polyphosphoric acid decomposes. The product is extracted into ether and the extracts dried over magnesium sulfate. The ether is removed and the residue dissolved in 100 ml. of toluene. Cooling gives the 8,9,10,11-tetrahydro-3-hydroxydibenz[b,d]oxepin-6(7H)one, m.p. 170°–175°. Two recrystallizations from ethyl acetate give an analytical sample, m.p. 183°–184°.

Anal. Calcd. for $C_{11}H_{14}O_3$: C, 73.02; H, 6.13. Found: C, 72.72; H, 5.94.

EXAMPLE 2

8,9,10,11-Tetrahydro-3-hydroxy-10-methyldibenz[b,d]oxepin-6(7H)one

A mixture of 34.2 g. (0.172 mole) of ethyl 2-oxo-4-methylcyclohexaneacetate, 18.8 g. (0.172 mole) of resorcinol, and 107 g. of polyphosphoric acid is heated on a steambath for 1 hour, cooled and poured into 150 ml. of ice water. When the polyphosphoric acid decomposes, the product is extracted into chloroform and the extracts dried over magnesium sulfate. The product (4.1 g., m.p. 140°–145°) is isolated by chromatography on silica gel and elution with chloroform. Recrystallization from methylcyclohexane gives 8,9,10,11-tetrahydro-3-hydroxy-10-methyldibenz[b,d]oxepin-6(7H)one, m.p. 144°–146°.

Anal. Calcd. for $C_{15}H_{16}O_3$: C, 73.75; H, 6.60. Found C, 73.83; H, 6.61.

EXAMPLE 3

8,9,10,11-Tetrahydro-3,10-dimethyl-1-hydroxydibenz[b,d]oxepin-6(7H)one

A mixture of 17.0 g. (0.1 mole) of 4-methyl-2-oxocyclohexaneacetic acid, 14.2 g. (0.1 mole) of orcinol monohydrate, 12 ml. (0.132 mole) of phosphorous oxychloride, and 200 ml. of benzene is heated to reflux for 2 hours, cooled in ice, and treated with 100 ml. of water. The benzene layer is separated, washed with sodium bicarbonate solution and dried with magnesium sulfate. The lactone 8,9,10,11-tetrahydro-3,10-dimethyl-1-hydroxydibenz[b,d]oxepin-6(7H)one is recrystallized twice from 15 volumes of nitromethane, m.p. 194°–196°.

Anal. Calcd. for $C_{16}H_{18}O_3$: C, 74.39; H, 7.02. Found: C, 74.72; H, 7.11.

EXAMPLE 4

8,9,10,11-Tetrahydro-1-hydroxy-10-methyl-3-n-pentyldibenz[b,d]oxepin-6(7H)one

A mixture of 7.1 g. (0.04 mole) of 4-methyl-2-oxocyclohexaneacetic acid, 6.8 g. (0.04 mole) of olivetol, 4.8 ml. (0.052 mole) of phosphorous oxychloride, and 80 ml. of benzene is refluxed for 2 hours, cooled, and 40 ml. of water added. The benzene layer is separated and washed with sodium bicarbonate solution. The solvent is removed and the lactone isolated by chromatography on silica gel and elution with a mixture of equal parts of toluene and chloroform. The lactone (3.8 g., m.p. 81°–82°) is recrystallized from nitromethane to give an analytical sample of 8,9,10,11-tetrahydro-1-hydroxy-10-methyl-3-n-pentyldibenz[b,d]oxepin-6(7H)one, m.p. 89°–91°.

Anal. Calcd. for $C_{20}H_{26}O_3$: C, 76.40; H, 8.34. Found: C, 76.74; H, 8.34

EXAMPLE 5

2,3-Dihydro-8-hydroxy-5-phenyl-1-benzoxepin-2-one

A mixture of 10.01 g. (0.1 mole) of resorcinol, 17.81 g. (0.1 mole) of 3-benzoylpropionic acid, 10 ml. (0.11 mole) of $POCl_3$, and 100 ml. of benzene is refluxed for 3 hours and stirred at room temperature overnight. The mixture is then cooled in ice and 50 ml. of water added dropwise. The solids which precipitate are filtered and treated with ether. Insoluble solids are filtered and the filtrate extracted with $NaHCO_3$ solution and dried over $MgSO_4$. Removal of the solvent gives 2,3-dihydro-8- hydroxy-5-phenyl-1-benzoxepin-2-one, m.p. 148°–150°.

Anal. Calcd. for $C_{16}H_{12}O_3$: C, 76.16; H, 4.80. Found: C, 75.89; H, 4.80.

EXAMPLE 6

5-(3,4-Dichlorophenyl)-2,3-dihydro-8-hydroxy-1-benzoxepin-2-one

A mixture of 24.7 g. (0.1 mole) of 3-(3,4-dichlorobenzoyl)pripionic acid, 11.0 g. (0.1 mole) of resorcinol, 10 ml. (0.11 mole) of phosphorous oxychloride, and 100 ml. of benzene is refluxed for 3 hours, cooled and treated with 100 ml. of water. The benzene layer is separated and washed with sodium bicarbonate solution. Removal of the benzene and recrystallization of the residue from nitromethane gives 5-(3,4-dichlorophenyl)-2,3-dihydro-8-hydroxy-1-benzoxepin-2-one, m.p. 198°–201°.

Anal. Calcd. for $C_{16}H_{10}Cl_2O_3$: C, 59.83; H, 3.14; Cl, 22.08. Found: C, 59.90; H, 3.27; Cl, 22.23.

EXAMPLE 7

8,9,10,11-Tetrahydro-1-hydroxy-1-methyl-3-(3-methyl-2-octyl)-dibenz[b,d]oxepin-6(7H)one A mixture of 16.35 g. (0.0695 M) of threo-5-(3-methyl-2-octyl)-resorcinol, 11.8 g. (0.0695 M) of 4-methyl-2-oxocyclohexaneacetic acid, 22 ml. of boron trifluoride etherate and 140 ml. of methylene chloride is refluxed for 2.5 hours, shaken with cold water and filtered through magnesium sulfate. Removal of the solvent gives an oil which is chromatographed on 1 kg. of silica and the product eluted with chloroform. The product (14.3 g.) so obtained is distilled in a Kugelrohr apparatus at 170°/0.5 mm. to give 8,9,10,11-tetrahydro-1-hydroxy-1-methyl-3-(3-methyl-2-octyl)-dibenz[b,d]oxepin-6(7H)-one, m.p. 65°–67°.

Anal. Calcd. for $C_{24}H_{34}O_3$: C, 77.80; H, 9.25. Found: C, 77.65; H, 9.30.

EXAMPLE 8

3-(2-Heptyl)-8,9,10,11-tetrahydro-1-hydroxy-10-methyldibenz[b,d]oxepin-6(7H)one

A mixture of 25.4 g. (0.15 M) of 4-methyl-2-oxocyclohexaneacetic acid, 31.3 g. (0.15 M) of 5-(2-heptyl)resorcinol, 46 ml. of boron trifluoride etherate, and 300 ml. of methylene chloride is refluxed for 3 hours, cooled and shaken with 1 liter of cold water. The organic layer is filtered through magnesium sulfate and the solvent removed. The residue is chromatographed on 1.5 kg. of silica and eluted with chloroform. The oily product is triturated with cyclohexane until solids form. Filtration and recrystallization from 60 ml. of nitromethane gives 16.14 g. (31.4 percent), m.p. 110°–113°. The combined residues from mother liquors are distilled in a Kugelrohr apparatus at 150°–155°/0.35 mm. to give an oil which solidifies on standing. Trituration with nitromethane gives 7.76 g. (46.5 percent) of a lactone. A 3.14 g. portion is recrystallized from 10 ml. of nitromethane to give 3-(2-heptyl)-8,9,10,11-tetrahydro-1-hydroxy-10  -methyldibenz[b,d]-oxepin-6(7H)one, m.p. 113°–115°.

Anal. Calcd. for $C_{22}H_{30}O_3$: C, 77.15; H, 8.83. Found: C, 77.09; H, 8.82.

EXAMPLE 9

8,9,10,11-Tetrahydro-1-hydroxy-3-n-hexyl-10-methyldibenz[b,d]oxepin-6(7H)one

A mixture of 19.4 g. (0.114 M) of 4-methyl-2-oxocyclohexaneacetic acid, 22.12 g. (0.114 M) of 5-hexylresorcinol, 230 ml. of methylene chloride, and 34 ml. of boron trifluoride etherate is allowed to stand at room temperature for 5 days. The solution is shaken with cold water and dried over magnesium sulfate. Removal of the solvent leaves an oil which is chromatographed on 600 g. of alumina. Elution with chloroform gives the crude product. Two recrystallizations from nitromethane give 8,9,10,11-tetrahydro-1-hydroxy-3-n-hexyl-10-methyldibenz[b,d]oxepin-6(7H)one, m.p. 85°–88°.

Anal. Calcd. for $C_{21}H_{28}O_3$: C, 76.78; H, 8.59. Found: C, 76.78; H, 8.56.

EXAMPLE 10

8,9,10,11-Tetrahydro-1-hydroxy-10-methyl-3-(2-methyloctyl)dibenz[b,d]oxepin-6(7H)one A mixture of 23.6 g. (0.1 M) of 5-(2-methyloctyl)resorcinol, 17.0 g. (0.1 M) of 4-methyl-2-oxocyclohexaneacetic acid, 30 ml. of boron trifluoride etherate, and 250 ml. of methylene chloride is refluxed for 3 hours, cooled and poured into 250 ml. of cold water. The organic layer is separated and shaken with dilute potassium carbonate then saturated NaCl and dried over magnesium sulfate. Evaporation of the solvent leaves 46.7 g. of oil. Distillation in a Kugelrohr apparatus at 190°–200°/0.4 mm. followed by chromatography on 300 g. of silica and elution with toluene gives 8,9,10,11-tetrahydro-1-hydroxy-10-methyl-3-(2-methyloctyl)-dibenz[b,d]oxepin-6(7H)one as a viscous oil.

Anal. Calcd. for $C_{24}H_{34}O_3$: C, 77.58; H, 9.25. Found: C, 77.85; H, 9.18.

I claim:

1. A compound of the following formula:

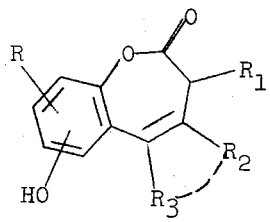

in which R is hydrogen or an alkyl of 1 to 9 carbon atoms, and $R_1$ is hydrogen, a lower alkyl of 1 to 4 carbon atoms or phenyl, $R_2$ and $R_3$ are hydrogen, lower alkyl of 1 to 4 carbon atoms, phenyl, halophenyl, dihalophenyl, dimethylphenyl, and alkoxyphenyl, or a heterocyclic group selected from nicitinoyl and thenoyl, or $R_2$ and $R_3$ are joined together by an alkylidene chain to form cyclohexyl or methyl-cyclohexyl.

2. A compound of claim 1 in which R is hydrogen.
3. A compound of claim 1 in which $R_1$ is hydrogen.
4. A compound of claim 1 in which R and $R_1$ are hydrogen, and $R_2$ and $R_3$ are joined together by an ethylene chain.
5. A compound of claim 1 in which R and $R_1$ are hydrogen, $R_2$ is hydrogen, and $R_3$ is phenyl.

6. The compound of claim 1 which is 2,3-dihydro-8-hydroxy-5-phenyl-1-benzoxepin-2-one.

7. The compound of claim 1 which is 8,9,10,11-tetrahydro-1-hydroxy-10-methyl-3-n-pentyldibenz[b,d]oxepin-6(7H)-one.

8. The compound of claim 1 which is 8,9,10,11-tetrahydro-1-hydroxy-3,10-dimethyldibenz[b,d]oxepin-6(7H)one.

9. The compound of claim 1 which is 8,9,10,11-tetrahydro-1-hydroxy-1-methyl-3-(3-methyl-2-octyl)-dibenz[b,d]oxepin-6(7H)one.

10. The compound of claim 1 which is 8,9,10,11-tetrahydro-1-hydroxy-10-methyl-3-(2-methyloctyl)-dibenz[b,d]oxepin-6(7H)one.

* * * * *

UNITED STATES PATENT AND TRADEMARK OFFICE
CERTIFICATE OF CORRECTION

PATENT NO. : 3,899,512

DATED : August 12, 1975

INVENTOR(S) : Jules Freedman

It is certified that error appears in the above-identified patent and that said Letters Patent are hereby corrected as shown below:

Column 3, line 17, "9,9,-10,11-" should read "8,9,10,11-".
Column 5, line 11, "pripionic" should read "propionic".

Signed and Sealed this twelfth Day of July 1977

[SEAL]

Attest:

RUTH C. MASON
Attesting Officer

C. MARSHALL DANN
Commissioner of Patents and Trademarks